(12) United States Patent
Martinez et al.

(10) Patent No.: US 8,680,489 B2
(45) Date of Patent: Mar. 25, 2014

(54) LITHOGRAPHY METHOD AND DEVICE

(71) Applicant: Commissariat à l'Energie Atomique et aux Energies Alternatives, Paris (FR)

(72) Inventors: Christophe Martinez, Grenoble (FR); Pascal Boulitreau, Sassenage (FR); Fabien Laulagnet, Fontaine (FR)

(73) Assignee: Commissariat à L'Énergie Atomique et aux Énergies Alternatives (FR)

( * ) Notice: Subject to any disclaimer, the term of this patent is extended or adjusted under 35 U.S.C. 154(b) by 0 days.

(21) Appl. No.: 13/629,869

(22) Filed: Sep. 28, 2012

(65) Prior Publication Data
US 2013/0082192 A1   Apr. 4, 2013

(30) Foreign Application Priority Data

Sep. 30, 2011   (FR) ...................................... 11 58861

(51) Int. Cl.
*G21K 5/04* (2006.01)

(52) U.S. Cl.
CPC ........................................ *G21K 5/04* (2013.01)
USPC ......... 250/492.2; 347/233; 347/239; 347/240

(58) Field of Classification Search
USPC .................. 250/492.2; 347/233, 239, 240
See application file for complete search history.

(56) References Cited

U.S. PATENT DOCUMENTS

| 3,665,483 | A | 5/1972 | Becker et al. |
| 7,643,049 | B2* | 1/2010 | Kishima ................ 347/239 |
| 8,310,512 | B2* | 11/2012 | Martinez ................ 347/233 |
| 2006/0139602 | A1 | 6/2006 | Munnig Schmidt |
| 2007/0182808 | A1 | 8/2007 | Stiblert et al. |
| 2008/0236734 | A1 | 10/2008 | Nonaka et al. |

FOREIGN PATENT DOCUMENTS

EP   2105921 A1   9/2009

OTHER PUBLICATIONS

French Search Report, dated May 22, 2012 of French Patent Application No. 1158861.

* cited by examiner

*Primary Examiner* — Kiet T Nguyen
(74) *Attorney, Agent, or Firm* — Kaplan Breyer Schwarz & Ottesen, LLP

(57) ABSTRACT

An installation and method for etching at least one wafer coated with an etch-ready, blank photosensitive layer is disclosed. In accordance with an embodiment, the wafer has thickness irregularities, wherein the wafer is arranged to be able to be submitted to irradiation-beam scanning, a sheet transparent to the radiation to which the photosensitive layer is sensitive covers the wafer, and a probe beam intended to reflect on the upper portion of the sheet perpendicularly to the irradiation beam spot on the photosensitive layer is provided.

11 Claims, 3 Drawing Sheets

LITHOGRAPHY METHOD AND DEVICE

FIELD OF THE INVENTION

The present disclosure relates to lithography methods and devices, intended to etch a pattern on a wafer.

DISCUSSION OF PRIOR ART

Generally, a lithography method is a method where a so-called photosensitive or thermosensitive layer having its properties modified by irradiation is deposited on a material to be etched. For example, the irradiation causes in the sensitive layer a chemical transformation which makes this layer selectively etchable by an etch product. Then, the layer affected by the radiation (or conversely, the unaffected portion of the layer) is removed and the remaining portions are used as mask to etch the substrate supporting the sensitive layer. There are many variations of such methods. For example, often, an intermediate layer is deposited between the substrate and the sensitive layer and the etching of the sensitive layer is followed by an etching of the intermediate layer and then only by an etching of the substrate. The layer may be literally photosensitive, that is, the photons interact with the material of the photosensitive layer to modify its state, or thermosensitive, that is, the sensitive layer is modified by the heat generated by the irradiation.

Certain thermosensitive layers react to irradiation by becoming volatizable or pulverulent, whereby it is no longer necessary to perform an etching with a chemical etch product, and the irradiated portions may be simply removed by blowing or rubbing of the areas which have been made pulverulent. In other words, the properties of bonding of the thermosensitive layer to the underlying layer are modified.

Generally, to irradiate selected locations of the sensitive layer, a laser beam scanning is performed. There is an increasing tendency to use laser beams in close ultraviolet, to decrease the spot size on the sensitive layer. Wavelengths on the order of 400 nm or less will for example be used.

During the scanning of the photo- or thermosensitive layer, the distance between the irradiation laser beam optical focusing system and the surface of the photosensitive layer must be very accurately maintained. To set this distance, the actual irradiation laser beam cannot be used since this beam is intermittent, in order to only irradiate the selected areas. A probe beam which crosses the optical focusing system of the main irradiation beam and reflects on the layer to be irradiated to permanently detect the distance between the optical focusing system and the layer to be irradiated (or more exactly to detect any variation of this distance) is thus used and the data collected by this probe beam are used to control the distance between the optical focusing system and the layer to be irradiated. There however is a difficulty in the case where the surface to be irradiated exhibits abrupt thickness variations or perforations, since the control signal is then lost. Thus, such conventionally-used probe beam methods enable to perform a position control on even surfaces only. This is a first problem that the present invention aims at solving.

Further, in the specific case where the material sensitive to an irradiation is a material where the variation of the properties of the sensitive layer reflects as a variation of the bonding of the irradiated portions, such being for example the case for a $PtO_x$-type material, which, after an irradiation, turns into pulverulent platinum, another issue, described in relation with FIGS. 1A to 1C, arises.

FIGS. 1A to 1C show a substrate 1, for example, made of glass, sapphire, or other, coated with a layer 2 of a thermosensitive material having its bonding properties varying according to an irradiation. It is desired to form on substrate 1, on the one hand, an opening 4 of minimum size, and on the other hand, an opening 6 having a size much greater than the minimum size.

FIG. 1A shows the result of the irradiation in an optimal case: the irradiated area is regularly modified, after which the portion of the $PtO_x$ layer turned into platinum can be removed in the region of opening 6 by brushing or blowing, the bonding of this layer portion to substrate 1 then being very low.

Unfortunately, after the irradiation, or during the irradiation, layer 2 is actually modified in irradiated region 6' as illustrated in FIG. 1B. The layer is partially turned into powder during the irradiation, which results in the forming of chips which, as illustrated in FIG. 1C, remain on portions 6" of the opening. Such chips may be projected on the optical irradiation system, and may disturb the writing by masking the irradiation beam or the probe beam.

Known lithography methods thus need to be improved.

SUMMARY

An embodiment provides overcoming at least some of the disadvantages of known lithography methods.

Another embodiment avoids the disadvantages associated with the forming of chips in a thermosensitive layer.

Another embodiment provides a lithography installation adapted to substrates having surface discontinuities.

Thus, an embodiment provides an installation for etching at least one wafer coated with a blank photosensitive layer, ready to be etched, this wafer having thickness irregularities, wherein the wafer is arranged to be able to be submitted to the scanning of an irradiation beam, a sheet transparent to the radiation to which the photosensitive layer is sensitive covers the wafer, and a probe beam intended to reflect on the upper portion of said sheet perpendicularly to the irradiation beam spot on the photosensitive layer is provided.

According to an embodiment, an installation for etching a plurality of wafers is provided, where each wafer is arranged in a receptacle of a support plate submitted to the scanning of an irradiation beam, and the sheet covers all the wafers and the support plate.

An embodiment provides an installation for etching a plurality of wafers coated with a blank photosensitive layer, ready to be etched, thickness irregularities being formed between the wafers, wherein the wafers are arranged to be able to be submitted to the scanning of an irradiation beam, a sheet transparent to the radiation to which the photosensitive layer is sensitive covers the wafers, and a probe beam intended to reflect on the upper portion of said sheet perpendicularly to the irradiation beam spot on the photosensitive layer is provided.

According to an embodiment, the sheet is glued.

According to an embodiment, the sheet has a 100-μm thickness.

According to an embodiment, the sheet is an added element having a substantially planar upper portion.

According to an embodiment, the photosensitive layer is a layer of a thermosensitive material having its bonding to the wafer modified after a heating.

According to an embodiment, the thermosensitive layer is a platinum oxide layer.

An embodiment provides a method for preparing a wafer or a plurality of wafers to be locally etched arranged in receptacles of a support plate comprising the steps of coating the wafer or the plurality of wafers with a photosensitive layer, and of coating the wafer or the plurality of wafers with a sheet transparent to the radiation to which the photosensitive layer is sensitive.

The foregoing and other features, and advantages will be discussed in detail in the following non-limiting description of specific embodiments in connection with the accompanying drawings.

DETAILED DESCRIPTION

Figure 1A:
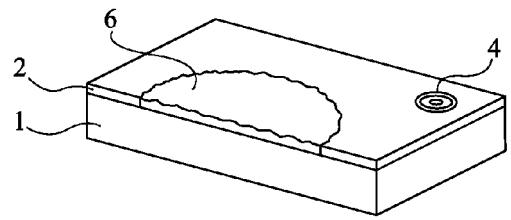
FIGS. 1A to 1C, previously described, illustrate a method of image forming on a layer of a photosensitive product of thermosensitive type, where the bonding of a layer on a substrate is decreased when this layer is heated.
Figure 1B:
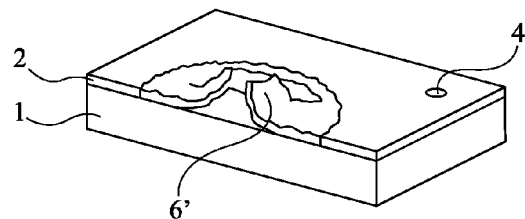
Figure 1C:
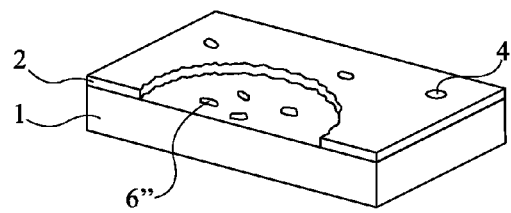
Figure 2A:
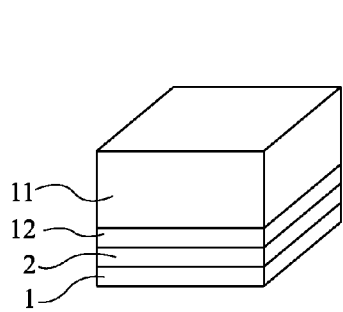
FIGS. 2A to 2E show successive steps of image forming on a thermosensitive layer.

In FIG. 2A, on a substrate 1 which is desired to be etched, a layer 2 of a thermosensitive material which has the property of becoming pulverulent or in any case little bonding to the substrate supporting it once it has been submitted to a heating radiation, has been deposited. Above thermosensitive layer 2, a sheet 11 has been glued via an adhesive 12. Layer 11 is made of a material transparent to the wavelength at which photosensitive material layer 2 is desired to be irradiated. The thermosensitive material for example is $PtO_x$, which turns into platinum once it has been submitted to a heating radiation.

Figure 2B:
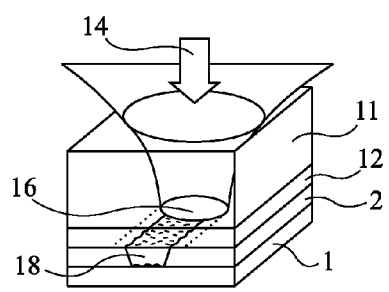

At the step illustrated in FIG. 2B, an irradiation is performed with a light beam 14 crossing sheet 11. Beam 14 is concentrated to form spot 16 on the surface of the thermosensitive material, which leads to modifying portion 18 of the photosensitive material which has been irradiated. In the shown example, the case where the light spot is displaced to form a groove of minimum width in thermosensitive material 2 has been considered.

Figure 2C:
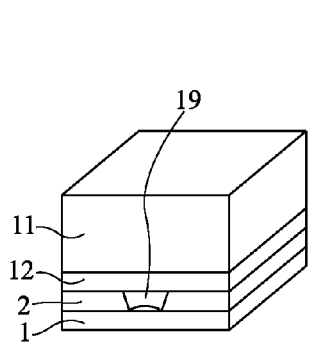

As very schematically illustrated in FIG. 2C, if separations and a forming of chips 19 tends to occur in irradiated area 18, these chips are trapped by sheet 11 glued to the thermosensitive layer and thus cannot contaminate the installation.

Figure 2D:
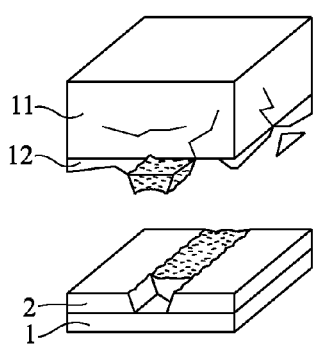

At the next step illustrated in FIG. 2D, protection sheet 11 is removed. This removal may be performed by simple tearing off or by submitting the structure to a product dissolving glue 12. Then, a portion at least of irradiated material 18 goes away with sheet 11 and the possible remaining portions are removed by conventional means, for example, by blowing with a pressurized fluid jet or by brushing.

Figure 2E:
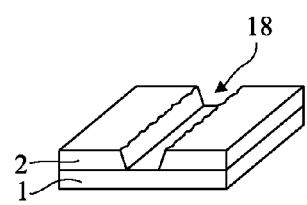

The structure shown in FIG. 2E where a groove 18 has been formed in the thermosensitive layer is thus obtained.

At next steps, not shown, the mask formed by the etched thermosensitive layer is used to etch substrate 1. This may be directly performed. An intermediate layer, or hard mask, which is etched and is used as a mask for etching the substrate, may also be used.

Many variations of this process will occur to those skilled in the art. For example, the intermediate layer capable of being used as a hard mask may be provided to be made of a good thermal insulator, so that the irradiation of the thermosensitive layer effectively cause a temperature rise at the level of this layer and to avoid for the heat to diffuse into the substrate if this substrate is relatively thermally conductive.

Another generic advantage of the above-described protection sheet to improve the tracking of a focusing device on a photosensitive material (currently called resist), whether this material is thermosensitive with a bonding variation or not, should also be noted.

Figure 3:
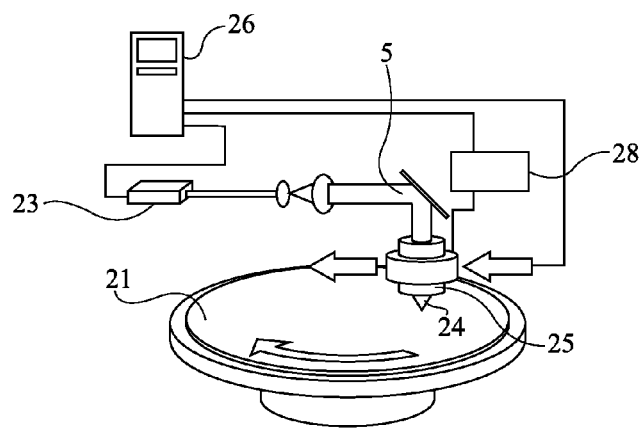
FIG. 3 shows a lithography installation.

FIG. 3 shows an example of a lithography installation of the type used to etch optical disks. A disk 21, coated with a photosensitive layer, receives the radiation of a laser 23. An optical device 25 or write head projects the beam of laser 23 in a quasi-point spot 24 on the disk which is rotated while the write head is shifted perpendicularly to the disk so that the spot follows a spiral path on the disk. A modulation device 26 is associated with laser 23 to provide intense light beams at selected locations. A focusing control device 28 is also provided to control a device for displacing write head 25 orthogonally to the disk to permanently maintain focused light on the disk. This control device comprises a probe beam or control beam which reflects on the disk at the same point as the irradiation spot. A variation of the distance between the write head and the disk translates as a displacement of the reflected probe beam.

Such a lithography installation is intended to operate at very high speed to have the shortest possible write time. Thus, the device for controlling the vertical position of the write head is particularly sensitive. If the disk surface comprises abrupt irregularities, this results in a loss of control and the entire write process is to be started over.

In practice, in certain cases, the disk on which the lithography is desired to be performed has discontinuities, for example, holes.

Thus, a method enabling to ensure the tracking of the write head even if the disk has discontinuities is here provided.

Figure 4:
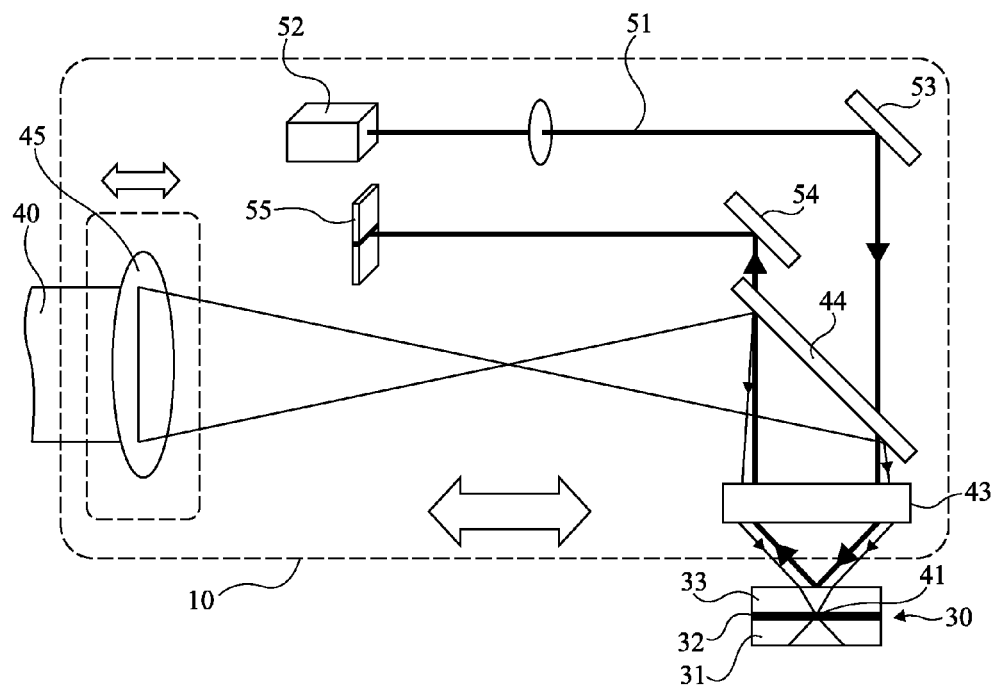
FIG. 4 shows in further detail an optical device for illuminating and controlling a photosensitive surface.

FIG. 4 shows a device for controlling the height of the write head with respect to the disk. A portion of the disk is shown at the bottom of the drawing under reference numeral 30. Disk 31 is coated with a photosensitive layer 32. Further, a sheet 33 transparent to the irradiation modifying the resin is glued to the entire disk above resist 32. A laser beam 40 is focused on a point 41 of the resist via an optical system comprising a light concentration device 43, a reflective plate 44, and lenses 45. The assembly formed of optical concentration system 43 and of lenses 45 is set so that the beam light focuses on point 41. A probe beam 51 emitted by a laser 52 which, by means of reflectors 53 and 54, is sent into optical concentration system 43 and returned to a detector 55, is further provided. The optical concentration system has been set so that light beam 51, instead of reflecting, as it usually does, on photosensitive layer 32, reflects on the upper surface of sheet 33 above spot 41. The wavelength of the probe beam is selected so that it crosses plate 44 with practically no attenuation, this plate, as it should be reminded, being reflective for irradiation beam 40.

Thus, due to the fact that, instead of reflecting on photosensitive layer 32 which reproduces possible surface defects of support 31 which is desired to be etched, the light reflects on the upper surface of sheet 33, the possible thickness discontinuities of the support are smoothed out by the sheet having a surface with, at most, light irregularities. By means of receiver 55 and of a conventional control system, optical concentration system 43 can thus have its height controlled so that laser beam 40 remains focused on the surface of photosensitive layer 32.

Of course, this optical system is likely to have various alterations, modifications, and improvements which will readily occur to those skilled in the art, the important point being that optical concentration system 43 forms a point image of the laser beam on the surface of photosensitive layer 32 and deviates the probe beam so that it reflects on the upper surface of sheet 33.

Figure 5A:
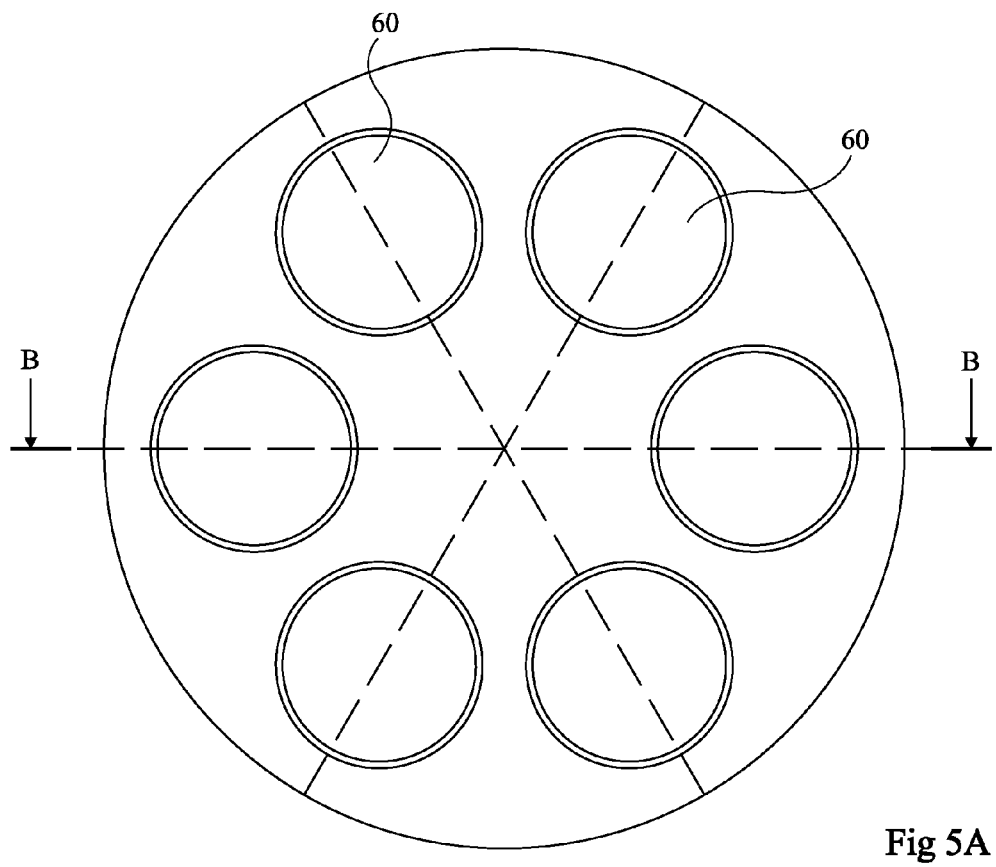
FIGS. 5A and 5B respectively are a top view and a cross-section view along line BB of FIG. 5A of a portion of a lithography installation.
Figure 5B:
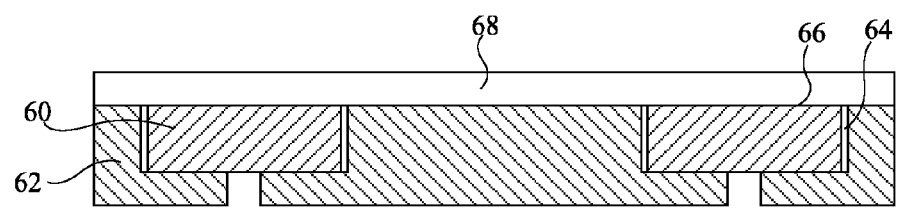

FIGS. 5A and 5B are cross-section views of an installation capable of using the system described in relation with FIG. 4. In this case, several wafers to be etched, for example, clock glasses 60, are arranged in receptacles of a support disk 62 so that the upper surface of the wafers is at the level of the upper surface of the support disk. This system replaces the disk shown in FIG. 3. Of course, thickness irregularities (deep grooves 64) will appear at the limits between wafers 60 and support 62.

Each wafer being coated with a photosensitive layer 66, the entire structure shown in top view in FIG. 5A is coated with a transparent layer 68 and the system will be used as described in relation with FIG. 4.

As an example of embodiment, the write laser will have a 405-μm wavelength, the probe beam will have a 650-μm wavelength, and the sheet will have a thickness on the order of 100 μm. This sheet will be made of a material or of stack of materials capable of being transparent at 405 nm and of being substantially reflective at 650 nm. This sheet may be a thin glass plate or a polycarbonate sheet.

Of course, the present invention is likely to have various alterations, modifications, and improvements which will readily occur to those skilled in the art. Especially, a specific scan system, of spiral type associated with a rotating disk, has been previously described. Any other scan system, for example, an XY scanning, may be provided.

Further, various embodiments with different variations have been described hereabove. Those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An installation for etching at least one wafer coated with a blank photosensitive layer (32), ready to be etched, this wafer having thickness irregularities, wherein:

the wafer (30) is arranged to be able to be submitted to a scanning of an irradiation beam, a sheet (33) transparent to the radiation to which the photosensitive layer is sensitive covers the wafer, and a probe beam intended to reflect on the upper portion of said sheet perpendicularly to the irradiation beam spot on the photosensitive layer is provided.

2. The installation for etching a plurality of wafers of claim 1, wherein:

each wafer (60) is arranged in a receptacle of a support plate (62) submitted to the scanning of an irradiation beam, said sheet (68) covers all the wafers and the support plate.

3. The etch installation of claim 1, wherein the sheet is glued.

4. The etch installation of claim 1, wherein the sheet has a 100-μm thickness.

5. The etch installation of claim 1, wherein the sheet is an added element having a substantially planar upper portion.

6. A wafer used in the etch installation of claim 1, wherein the photosensitive layer is a layer of a thermosensitive material (2) having its bonding to the wafer (1) modified after a heating.

7. The wafer of claim 6, wherein the thermosensitive is a platinum oxide layer.

8. An installation for etching a plurality of wafers coated with a blank photosensitive layer (32), ready to be etched, thickness irregularities being formed between the wafers, wherein:

the wafer (30) is arranged to be able to be submitted to the scanning of an irradiation beam, a sheet (33) transparent to the radiation to which the photosensitive layer is sensitive covers the wafers, and a probe beam intended to reflect on the upper portion of said sheet perpendicularly to the irradiation beam spot on the photosensitive layer is provided.

9. The etch installation of claim 8, wherein the sheet is glued.

10. The etch installation of claim 8, characterized in that the sheet has a 100-μm thickness.

11. The etch installation of claim 8, wherein the sheet is an added element having a substantially planar upper portion.

* * * * *